United States Patent
Kuz et al.

(10) Patent No.: US 8,032,108 B2
(45) Date of Patent: *Oct. 4, 2011

(54) METHOD, DEVICE AND SYSTEM FOR TRANSMITTING AN EMERGENCY CALL

(75) Inventors: Volker Kuz, Braunchweig (DE); Ralph Behrens, Schellerten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1284 days.

This patent is subject to a terminal disclaimer.

(21) Appl. No.: 10/563,069

(22) PCT Filed: Jun. 30, 2004

(86) PCT No.: PCT/EP2004/007127
§ 371 (c)(1),
(2), (4) Date: Jan. 29, 2007

(87) PCT Pub. No.: WO2005/004519
PCT Pub. Date: Jan. 13, 2005

(65) Prior Publication Data
US 2007/0142026 A1 Jun. 21, 2007

(30) Foreign Application Priority Data
Jun. 30, 2003 (EP) ..................................... 03014853

(51) Int. Cl.
*H04M 11/04* (2006.01)
*H04W 4/00* (2009.01)
*G06F 15/173* (2006.01)

(52) U.S. Cl. .................. 455/404.1; 455/404.2; 455/466; 709/224

(58) Field of Classification Search ................ 455/404.1
See application file for complete search history.

(56) References Cited

U.S. PATENT DOCUMENTS

| 4,163,218 | A | * | 7/1979 | Wu | 340/310.12 |
| 6,154,658 | A | * | 11/2000 | Caci | 455/466 |
| 6,711,399 | B1 | * | 3/2004 | Granier | 455/404.1 |
| 6,765,495 | B1 | * | 7/2004 | Dunning et al. | 340/903 |
| 2002/0055350 | A1 | * | 5/2002 | Gupte et al. | 455/412 |
| 2003/0009550 | A1 | * | 1/2003 | Taylor et al. | 709/224 |
| 2003/0050039 | A1 | | 3/2003 | Baba et al. | |
| 2003/0222782 | A1 | * | 12/2003 | Gaudreau | 340/573.6 |
| 2004/0203652 | A1 | * | 10/2004 | Yan | 455/414.1 |

FOREIGN PATENT DOCUMENTS
WO WO 03/003327 A1 1/2003

* cited by examiner

*Primary Examiner* — Lester Kincaid
*Assistant Examiner* — Andy Gu

(57) ABSTRACT

This invention relates to a method and an emergency call device for transmitting an emergency call including emergency information from a vehicle using a mobile communication system. Further this invention is related to an emergency call system comprising the emergency call device and an emergency call assistance center. To provide a method for transmitting an emergency call which increases the reliability of data transmission this invention provides a method for transmitting an emergency call including emergency information from a vehicle using an mobile communication system. After an emergency call has been triggered at the vehicle, the method establishes a data connection to an emergency call assistance center via the mobile communication system, transmits emergency information to the emergency call assistance center using the data connection, establishes a first voice connection to the emergency call assistance center via the mobile communication system, and transmits a DTMF message including emergency information using the established first voice connection.

23 Claims, 5 Drawing Sheets

METHOD, DEVICE AND SYSTEM FOR TRANSMITTING AN EMERGENCY CALL

This application claims the benefit of priority from European Application No. 03014853.0, filed Jun. 30, 2003 and PCT Application No. PCT/EP2004/007127, filed Jun. 30, 2004 both of which are incorporated by reference.

FIELD OF THE INVENTION

This invention relates to a method and an emergency call device for transmitting an emergency call including emergency information from a vehicle using a mobile communication system. Further this invention is related to an emergency call system comprising the emergency call device and an emergency call assistance center.

RELATED ART

In the near future, networked vehicles will be an essential participants in smart, wireless networks and vehicle manufacturers started to integrate wireless-based telematics services in their vehicles. The term telematics refers to the emerging market for in-vehicle communications that combines wireless voice and data transfer with GPS positioning technology to provide location-based connectivity, security, information enhanced productivity, and entertainment services. Telematics capitalizes on the emergence and proliferation of sophisticated broadband wireless communications technology and e-commerce.

A typical example for providing telematics services are emergency call systems (e-call systems). These systems instantly connect vehicle occupants to a emergency call (e-call) assistance center or to an e-call dispatch center for emergency assistance or roadside services while automatically reporting e.g. the vehicles position, the vehicle's identification number and other data related to the emergency. The article "Telematics: safe and fun driving" by Yilin Zhao, IEEE Intelligent Systems (Vol. 17), 2002, provides a overview on state of the art emergency call systems and employed protocols such as the Application Communication Protocol (ACP), the Global Automotive Telematics Standard (GATS) or the Motorola Emergency Messaging System (MEMS).

These protocols are used for transmitting e-calls via various analog and digital cellular networks such as GSM, UMTS, AMPS, CDMA, GPRS, etc. Further, messaging services such as the Short Message Service (SMS) may also be employed for transmitting emergency information i.e. emergency related data between the vehicle met by an emergency and an emergency call assistance center. Emergency call services are seldom needed, but in case an emergency call is triggered the emergency information have to be transmitted highly reliable and instantaneously.

SUMMARY OF THE INVENTION

Therefore, there is a need to provide a method for transmitting an emergency call which increases the reliability of data transmission. Further, there is a need to provide a method for instantaneously transmitting emergency related information to a emergency call assistance center or dispatch center.

To meet these needs, this invention provides a method for transmitting an emergency call including emergency information from a vehicle using an mobile communication system. After an emergency call has been triggered at the vehicle, the method establishes a data connection to an emergency call assistance center via the mobile communication system, transmits emergency information to the emergency call assistance center using the data connection, establishes a first voice connection to the emergency call assistance center via the mobile communication system, and transmits a dual tone multi-frequency (DTMF) message including emergency information using the established first voice connection.

It is also advantageously to determine whether the emergency information have been successfully transmitted to the emergency call assistance center as this step allows to act upon the transmission status of the emergency information increasing the reliability of the emergency call.

In case the emergency information has been transmitted successfully, the first voice connection to the emergency call assistance center is transferred to an emergency assistant at the emergency call assistance center. This allows an interaction between an assistant at the emergency call assistance center and an occupant of the vehicle met by an emergency, while at the same time all transmitted emergency information are already available to the assistant at the emergency call assistance center.

In this scenario the emergency call assistance center may detect the end of the DTMF message transmitted via the first voice connection in order to be able to transfer the voice call to the emergency call assistant.

In case the emergency information has not been transmitted successfully to the emergency call assistance center a second voice connection to a emergency call dispatch center directly may be established via the mobile communication system, as no emergency information that may be useful for further handling the emergency call are available at the emergency call assistance center due to a failure during transmission. The voice connection for transmitting the DTMF message to the emergency call assistance center may be closed before establishing the second voice connection to the dispatch center in this case.

Advantageously the data connection used for transmitting the emergency information to the emergency call assistance center is a WAP (Wireless Application Protocol) connection. This allows transmitting the emergency information to the emergency call assistance center via the data connection wherein the emergency information may be transmitted in an request for an emergency call URL (Uniform Resource Locator).

Further, an emergency call countdown may be started in the emergency call device during which an occupant of the vehicle may cancel the triggered emergency call. By introducing a delay before transmitting an emergency call, emergency calls triggered by accident or error e.g. due to a failure of sensors may be stopped by an occupant of the vehicle.

In case of an accident, it may be desirable to test the availability of the mobile communication system before trying to transmit an emergency call. Testing the availability of the mobile communication system may comprise testing the operability of a mobile terminal in the vehicle for transmitting the emergency information and testing the communication network of the communication system for availability.

The emergency information transmitted using the data connection may comprise information related to the emergency as will be outlined in more detail further down below.

As the time required for a data transfer via DTMF is directly related to the data size transmitted—each DTMF tone indicating a character is approximately 100 ms long—, the emergency information transmitted using voice connection may only comprise the geographical position of the vehicle and an identification number of the terminal transmitting the emergency information.

Since redundant emergency information may be transmitted to the emergency call assistance center using the data and the voice connection, it may be of advantage to synchronize the emergency information received at the emergency call assistance center e.g. such that possible errors during transmission may corrected or information may be supplemented.

In order to facilitate the recognition at the vehicle whether the emergency information have been successfully transmitted, a confirmation for the emergency information received may be transmitted from the emergency call assistance center to the vehicle.

In case it becomes e.g. necessary to receive more information related to an emergency than have initially been transmitted from the vehicle to the emergency call assistance center, the assistance center may request further emergency information from the vehicle via the mobile communication system. These requested information may be automatically transmitted to the emergency call assistance center or upon an interaction between the emergency call assistance center and an occupant of the vehicle.

The emergency call assistance center may further inform a emergency call dispatch center on the emergency using the received emergency information. Using the emergency call assistance center as an intermediate instance in the emergency call chain, various dispatch centers e.g. for police assistance, fire assistance, etc. may be contacted automatically without further interaction required by an occupant of the vehicle.

A suitable device for executing the above outlined emergency call method is a emergency call device. This invention further provides an emergency call device that may transmit an emergency call including emergency information from a vehicle using an mobile communication system.

The emergency call device may comprise a triggering means for triggering an emergency call at the vehicle, such as an emergency button or a sensor that triggers an alarm in case of an accident.

Further, the emergency call device may comprise a communication terminal interoperable with the mobile communication system for establishing a data connection to an emergency call assistance center via the mobile communication system, for establishing a first voice connection to the emergency call assistance center via the mobile communication system, for transmitting emergency information to the emergency call assistance center using the data connection, and for transmitting a dual tone multi-frequency (DTMF) message including emergency information using the established first voice connection.

The emergency call device may further comprise means for determining the end of the DTMF message that has been transmitted from the device to the emergency call assistance center using the first voice connection, in order to transfer the voice call to an emergency call assistant.

To be able to determine the geographical position of the vehicle met by an emergency the emergency call device may also comprise a position determination means for determining the geographical position of the vehicle. An example for a position determining device are GPS (Global Positioning System) receivers, but also the cellular phone system may be used determine the position of the vehicle, i.e. the position of the communication terminal included in the emergency call device of the vehicle.

The emergency call device may further comprise processing means for forming emergency information. The processing means may be adapted to form emergency information comprising the geographical position of the vehicle and identification number of the vehicle, such as an identification of the emergency requesting device or the IMEI (International Mobile Equipment Identification) of the mobile communication terminal.

The emergency information may further comprise a history of information related to a time period before an emergency. The history of information may indicate at least one or a combination of the following parameters: the steering of the vehicle, a level of deceleration of the vehicle and a driving direction of the vehicle.

Additionally further emergency relevant information such as a timestamp of the generation of the emergency message, vehicle descriptors including e.g. the model, color and license plate of the vehicle, a breakdown status including. e.g. the cause of a breakdown, sensors that triggered the emergency call and additional descriptive data, and additional driver defined information and parameters may be transmitted.

The emergency call device may further comprise a timer for controlling an emergency call countdown during which an occupant of the vehicle may cancel the triggered emergency call.

Additionally, a memory for storing a history of geographical vehicle positions may be included in the emergency call device.

Further this invention provides an emergency call system for executing the method outlined above, wherein the system may comprise at least one emergency call device and an emergency call assistance center.

BRIEF DESCRIPTION OF THE FIGURES

In the following, this invention will be described in more detail in reference to the attached figures and drawings. Similar or corresponding details in the figures are marked with the same reference numerals.

DETAILED DESCRIPTION OF THE INVENTION

Figure 1:
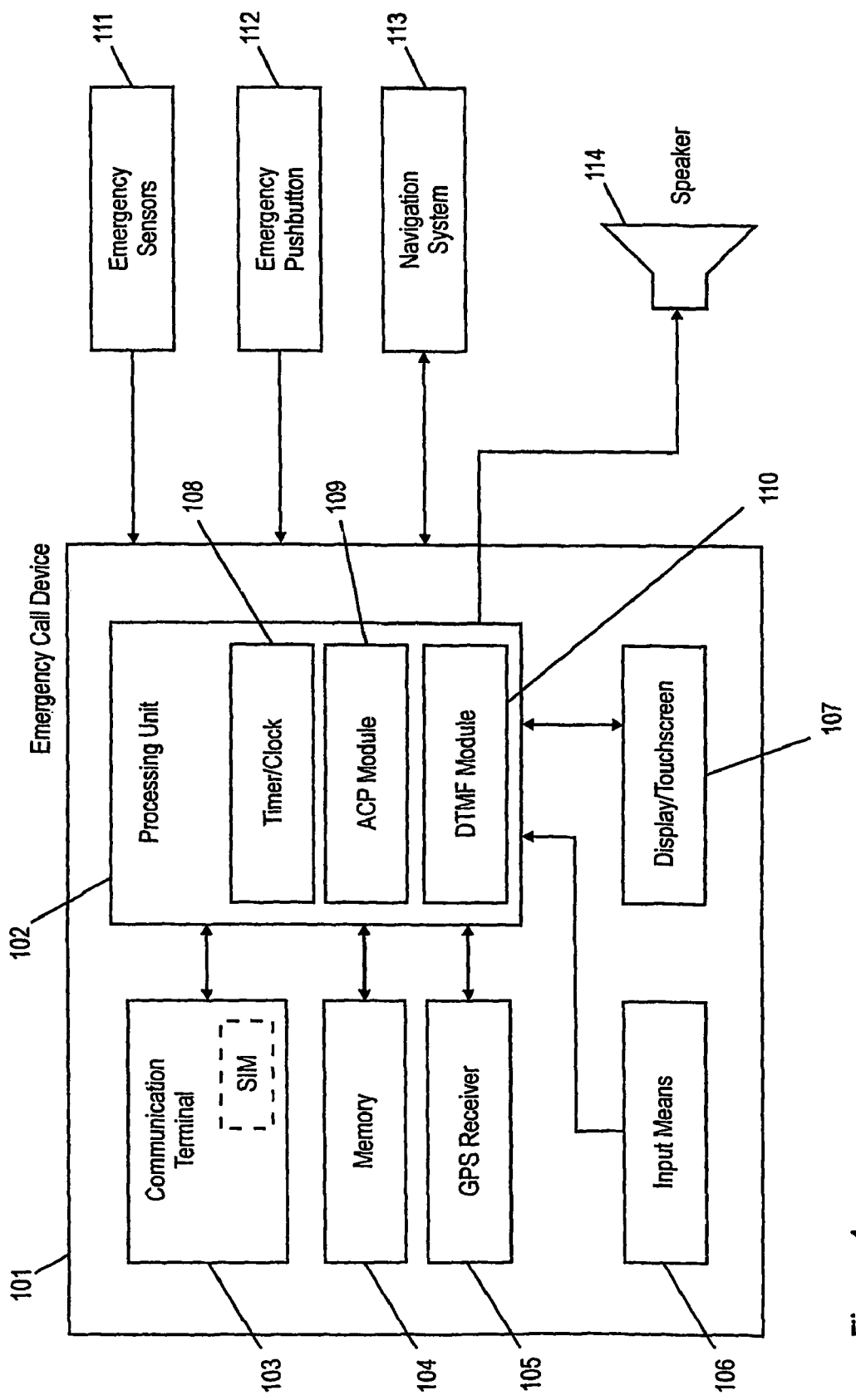
FIG. 1 shows a example of an emergency call device that may be used for transmitting an emergency call.

FIG. 1 shows the components of an illustrative emergency call device 101. The emergency call device 101 may for example be integrated into a radio receiver of the vehicle. The device may comprise a processing unit 102 for processing data output and/or input by an occupant of the vehicle, processing received data or data to be transmitted, etc. Further a communication terminal 103 for providing connectivity to radio access networks offering telematics services as well as providing data and voice communication may be integrated in the device. A memory 104 allows to store intermediate data such as a GPS location history in the device. A location history may comprise a predetermined number of information or events on the actions of the vehicle in a time frame immediately before an emergency.

Transmitting a GPS history, the information on the vehicle and route taken by same in the last minutes before the emergency call, may be processed at the emergency call assistance center 401 (see FIG. 4) and the processing result may be displayed e.g. on an on-screen map to the assistant serving the emergency call. The processed GPS history may provide vehicle related data—such as vehicle identification number, license plate, country of registration, etc.—or data related to the occupant—such as name, address, information on his/her medication, blood type, contact of the family doctor, family contacts in case of emergency, etc. Further, the GPS history may also indicate the driving direction before the emergency, the deceleration level, which may suggest an emergency braking situation, and/or any atypical steering before the emergency, which may indicate black ice, slush, aquaplaning, etc.

The GPS history may be continuously logged by the emergency call 101 device using data obtained from various sensors and/or the navigation system 113. For example, the history may contain information about the last 5 minutes of the route taken by the occupant of the vehicle prior to triggering the emergency call and these information may be updated every 30 s.

A position determining device such a an GPS receiver 105 may be also included for obtaining the current position of the vehicle for example for navigation purposes or for reporting the vehicle's position in case of an emergency. Further, the device 101 may be connected to a navigation system 113.

Further, the device may include input and output means 106, 107 such as a keyboard or pushbuttons, speaker(s), a display/touch-screen, etc., which allow an occupant of the vehicle to interact with the emergency call device 101 in the vehicle not only in case of an emergency.

In order to be able to form and transmit DTMF and ACP messages—or messages according to other communication protocols commonly used in telematics as outlined in the introduction—the device may further comprise an DTMF module 110 and an ACP module 109, which may be integrated into the processing unit of the device.

Further, the processing unit may comprise a timer/clock 108, which allows to control countdowns and provides the current time. The countdown may be used to delay a triggered emergency call for a short period of time to allow an occupant of the vehicle to cancel the emergency call in case it has been triggered by accident or by error. The current time is relevant when including a timestamp in the messages communicated via the communication terminal 103 to a receiving entity, such as an emergency call assistance center 401.

The device 101 may be connected to one or several sensors 111 indicating an emergency and which may automatically trigger an emergency call or to an emergency pushbutton 112 which has to be pressed by a person in order to initiate an emergency call. An emergency must not necessarily be a car accident but may also refer to a car breakdown, car theft, a malfunction of the vehicle's engine, a sanitary emergency of an occupant of the vehicle, etc.

A SIM (Subscriber Identity Module) card may be inserted into the communication terminal 103 in the device to identify the subscriber of communication terminal 103 to a communication network. Usually a SIM card is required for the proper operation of the communication terminal 103, but in most communication systems dispatch centers for emergency calls may be also contacted without inserting a SIM card into the mobile phone in case of an emergency. The emergency call dispatch centers are available e.g. by dialing 112 in Europe or 911 in the United States of America.

The communication terminal 103 may be capable of establishing data connections using the WAP protocol. WAP defines a protocol stack and data formats for the physical layer up to session layer. WAP-enabled browsers on the application layer may be used to request, transmit and receive data via a WAP connection. The data, in particular the emergency related information that may be transmitted to an emergency call assistance center 401 in case of an emergency, may be appended in a request of emergency call URL and thereby be transmitted to the emergency call assistance center 401.

An example for an emergency call URL that is contacted in case of emergency is:

http://emergency.harman-becker.de/emergency-assistance.jsp?
<emergency information>

In this example URL the emergency call assistance center 401 may be contacted at http://emergency.harman-becker.de/emergency-assistance.jsp while the emergency data that are provided to the assistance center 401 are appended behind the ? as indicated by <emergency information>.

The emergency data that are transmitted to the emergency call assistance center 401 may be formatted using a variety of protocols such as ACP, GATS or MEMS or using a proprietary format. The formatted emergency information may be transmitted using WML/HTML data transfer as shown in the exemplary emergency call URL.

In comparison to transmitting emergency information through SMS short messages, the transfer via the WAP protocol allows an immediate delivery of the data to the assistance center 401 (which is not insured for SMS messages), less payload restrictions and overcomes the problem that SMS services are not available everywhere. For Europe, the availability of WAP gateways may be guaranteed in contrast.

The DTMF module may be included in the emergency call device 101 in order to format the emergency information for their transmission to the emergency call assistance center 401 via a voice connection. As the time required for a data transfer via DTMF is directly related to the data size transmitted—each DTMF tone indicating a character is approximately 100 ms long—it may be considered to include less data in forming emergency information compared to the case of transmitting the emergency information via a data connection such as a WAP connection. In a situation of psychological stress such as an emergency, this may significantly improve the user-friendliness since the emergency caller may be connected an emergency call assistant faster.

As an example the emergency information transmitted via a voice connection using DTMF may comprise the vehicles current position—longitude and latitude—and the phone number of the transmitting communication terminal 103 for identifying same. The exemplary format in which the emergency information in the DTMF format may be transmitted could be a 10 digit WGS84 coded longitude followed by a 10 digit WGS84 coded latitude and the telephone number of the transmitting communication terminal 103. An example is shown below:
0012347120 *034523490 00491724871000

The spaces shown in this example have been introduced to illustrate the location of the three parameters in the DTMF message. The first digit of the longitude and latitude may be a 0 character if it the parameter is a positive number and a * character if it is a negative number. The international prefix 0049 of the phone number may be also expressed as +49.

Before sending the DTMF message comprising the emergency information, it may be desirable to delay the transmission by e.g. 2 seconds after connection establishment to the emergency call assistance center 401 in order to ensure that the emergency information are received correctly.

Figure 2:
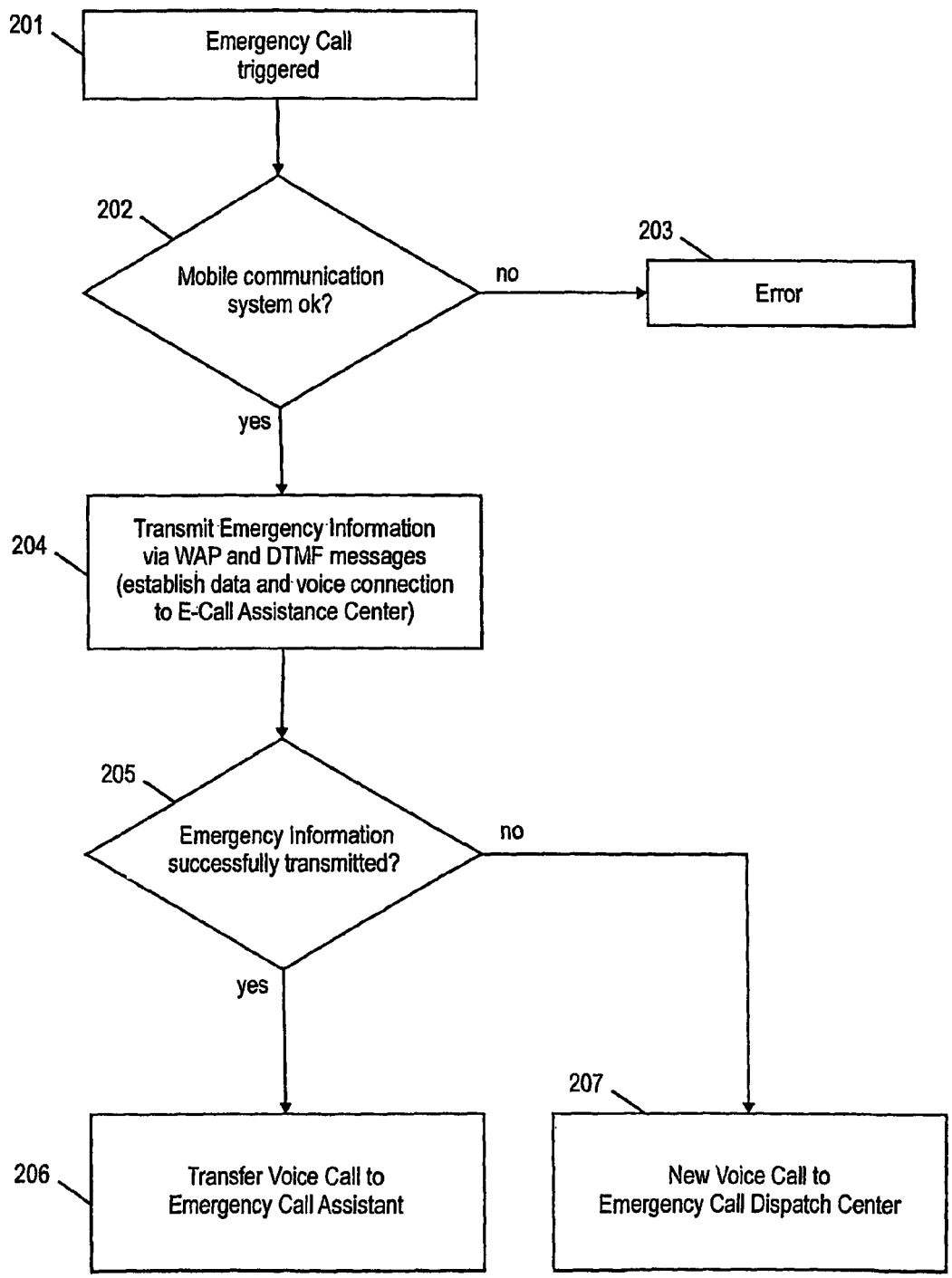
FIG. 2 shows a flow chart of an exemplary emergency call procedure.

FIG. 2 shows a flow chart of an exemplary emergency call procedure according to this invention. Upon triggering an emergency call 201, for example, manually via push button in the vehicle or automatically, for example, by sensors or triggers, the device transmitting the emergency call may test the availability of the communication system 202. In case the communication terminal 103 in the device has been damaged or no communication network is available, an error may be triggered 203 and an emergency call may not be transmitted.

Further, it is noted that in case that only the SIM card of the communication terminal 103 is damaged in the emergency call device 101, it may still be possible to transmit an emergency call by contacting an emergency call dispatch center 401 by dialing 112 in Europe or 911 in the United States as outlined above.

In case the communication terminal 103 or phone is not damaged and a communication network can be accessed, the device may transmit emergency information 204 to the emergency call assistance center 401. First, the device may establish a data connection, such as WAP connection, to the emergency call assistance center 401. The device gathers the relevant emergency-related information that may be transmitted to the emergency call assistance center 401.

The emergency information may, for example, be included in an emergency call message according to the emergency call message protocol of a ACP. This emergency call message may be transmitted to the emergency call assistance center 401 when requesting an emergency URL using the data connection. In the request, the emergency information is transmitted such that it will be become available to the assistant serving the emergency call at the emergency call assistance center 401 as outlined in reference to FIG. 1.

According to the emergency call message protocol, the receiving side, i.e. the emergency call assistance center 401, may acknowledge the reception of the emergency information by an emergency call reply message. After transmitting the emergency information via the data connection, the connection may be torn down.

Next, the device may establish a voice connection to the emergency call assistance center 401 in order to transmit emergency information using a DTMF message. The emergency information transmitted to the emergency call assistance center 401 using the DTMF message may comprise redundant information to the emergency information transmitted using the data connection and may be formatted as explained above. This may enhance the reliability of the transmission of emergency information.

Further, it may be also possible to synchronize the emergency information received via the data connection and the voice connection at the emergency call assistance center 401 such that errors may be corrected or the information may supplement each other. The emergency call assistance center 401 can easily recognize emergency information that have been received either via a WAP connection or via a voice connection (DTMF message) belonging to the same emergency call, since in both cases—receiving the emergency call information via WAP or via a voice connection—the identification number (e.g. IMEI) of the emergency call transmitting terminal is communicated/known to the assistance center 401.

In case the emergency information has been successfully transmitted 205, the device uses the established connection for transmitting the DTMF message allowing further Interaction between an occupant of the vehicle and the serving assistant at the assistance center 401. The end of the DTMF message may be detected at the emergency call assistance center 401 and the established voice call may be transferred 206 to an assistant serving the emergency call at the emergency call assistant center 401. As the number of characters transmitted in the DTMF message is known as well as the duration of a character during transmission, the voice call may be transferred to the assistant after a time period T of:

$$T = \text{number of characters} \times \text{duration of a character}(100 \text{ ms}).$$

To ensure that the DTMF message has been transmitted, the transfer may be performed after expiry of the time period T plus an additional securing time interval, e.g. of 1-2 seconds in length.

This interaction may be very useful for informing an occupant about the arrival time of emergency assistance, together with further information relevant for the emergency call assistance center 401. Alternatively, the emergency call device 101 in the vehicle may establish another voice connection to the emergency call assistance center 401 in order to allow interaction between the assistant and an occupant of the vehicle.

In case an error has occurred during transmission of the emergency information and none of this information has been successfully transmitted to the emergency call assistance center 401, the device may recognize the failure during data transmission and connect an occupant of the vehicle to an emergency call dispatch center 401 directly by establishing a voice connection. In this case, the device may automatically dial a well-known emergency number 207 of a dispatch center 402 such as 112 for Europe or 911 for the United States.

As outlined above, the direct connection to an emergency call dispatch may be desirable in case no emergency information has been transmitted to the emergency call assistance center 401, since without these information the assistance center 401 may not provide useful services to the emergency caller, such that a direct connection to the emergency call dispatch center 402 may be preferred.

Figure 3:
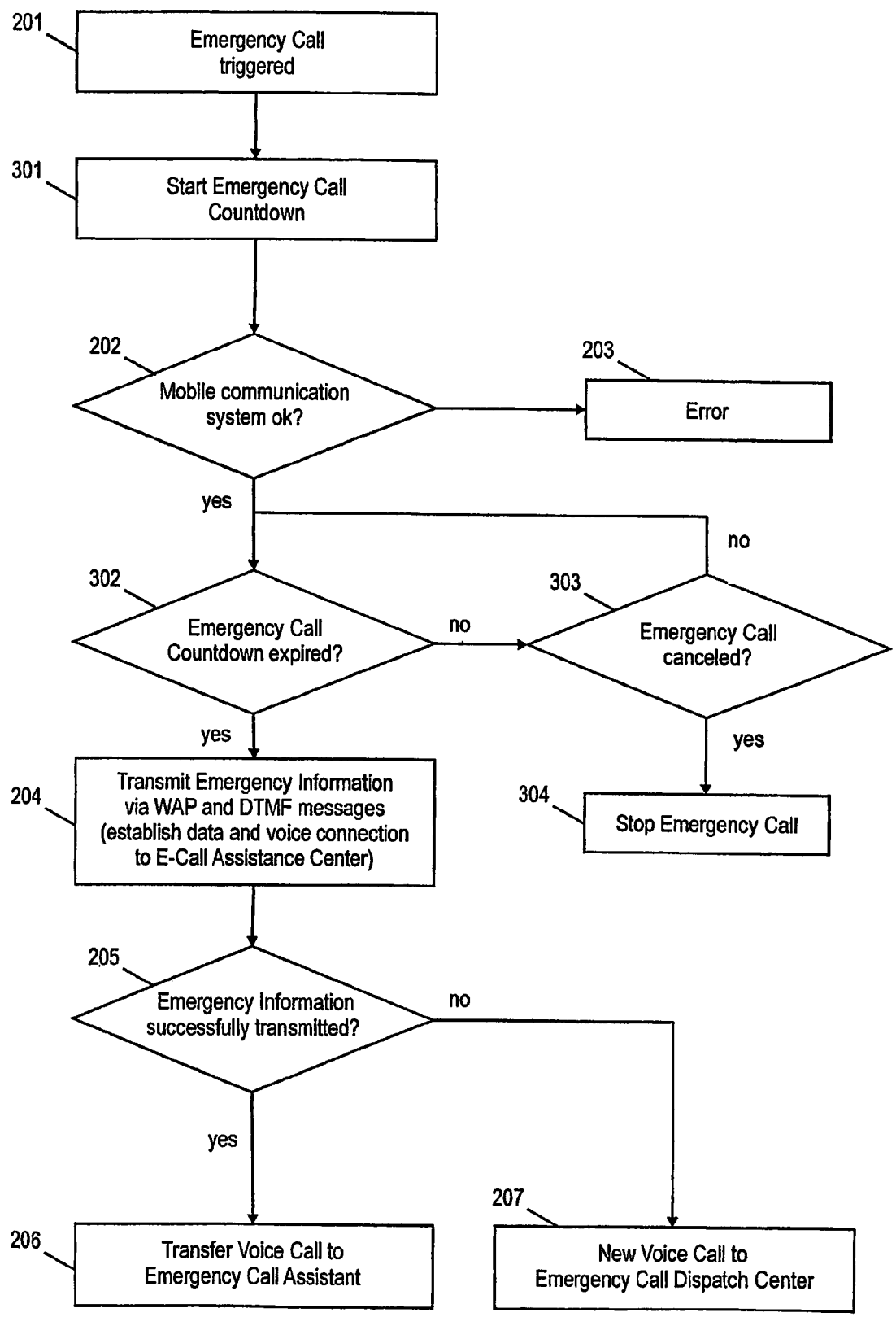
FIG. 3 shows an enhanced version of the emergency call procedure as shown in FIG. 2.

FIG. 3 shows an enhanced version of the emergency call procedure as shown in FIG. 1. As it is possible that an emergency call is triggered by accident, for example, due to sensor error, or it is not necessary to call assistance for example after a minor accident, the emergency call device 101 may output that a emergency call is about to be started to the occupant of the vehicle and start an emergency call countdown 301. To output the announcement the attached means for interacting with the occupant, e.g. a display, the speakers 114 or both, may be used. During this countdown time 302, an occupant of the vehicle may cancel the emergency call 303 in case he/she does not wish to place a request for assistance or in case the emergency call has been automatically triggered by accident or error. A cancellation of the emergency call will end the emergency call procedure 304.

In case the countdown expires without a cancellation of the emergency call, the emergency information may be transmitted 204 via a data connection or a voice connection using ACP and DTMF messages as outlined above. Upon a successful transmission of the emergency information 205, the voice connection to the emergency call assistance center 401 may be transferred 206 to an emergency call assistant, while in case the emergency information has not been successfully transmitted, a voice connection to the emergency call dispatch center 402 may be established 207 directly.

Figure 4:
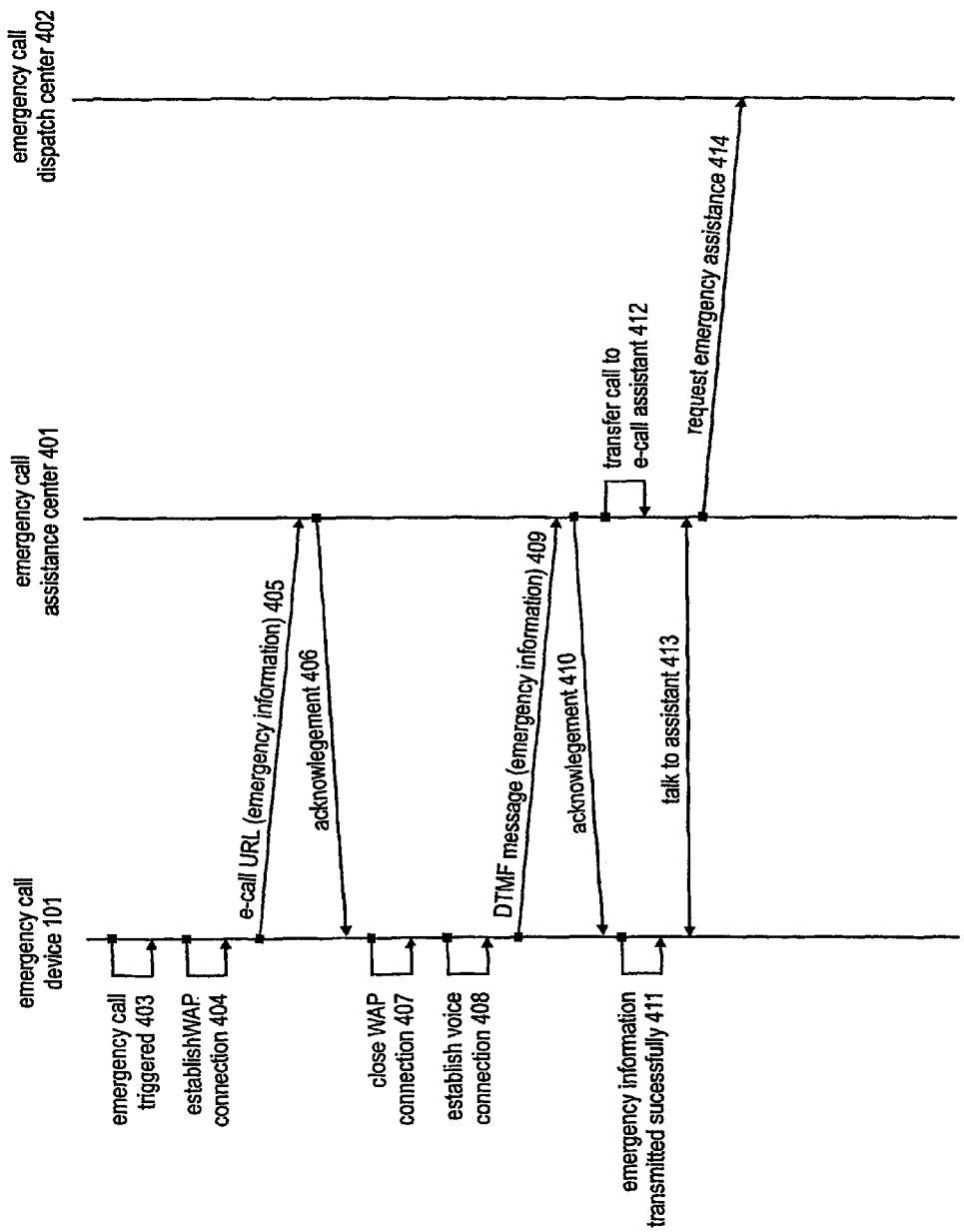
FIG. 4 shows the message flow and tasks performed in an exemplary emergency call system comprising an emergency call device, an emergency call assistance center and an emergency call dispatch center.

FIG. 4 shows the message flow and tasks performed in an exemplary emergency call system comprising an emergency call device 101, an emergency call assistance center 401 and an emergency call dispatch center 402.

Upon triggering an emergency call in the vehicle 403, a WAP connection is established 404 by the emergency call serving device in the vehicle. Upon successfully establishing the WAP connection, an emergency call URL may be requested 405 and emergency information may transmitted attached to the emergency call URL to the emergency call assistance center 401 as outlined above.

The emergency call assistance center 401 may in turn acknowledge the receipt of the emergency information 406. The format in which the emergency information may be provided to the emergency call assistance center 401 by the vehicle may be, for example, in accordance with the emergency call message protocol as defined by the application communication protocol (ACP). As has been previously outlined, the emergency information may comprise various data relevant to serving an emergency call, such as the geographical position of the vehicle, an identification of the assistance requesting device, for example the IMEI of the communication terminal 103 used to transmit the emergency call, a vehicle descriptor, etc. which may be transmitted from the vehicle to the emergency call assistance center 401.

The emergency call assistance center 401 may acknowledge the safe receipt of the emergency call information by sending a reply message 406, for example, an emergency call reply message in accordance with the emergency call message protocol.

After transmitting the emergency information to the emergency call assistance center 401, the serving device in the vehicle may close the data connection 407 and establish a voice connection 408 to the emergency call assistance center 401.

The emergency call device 101 may form a new set of emergency information that may be formatted as DTMF messages and may be transmitted 409 to the emergency call assistance center 401 using the established voice connection. The emergency information contained in the DTMF messages and the emergency information in the emergency call URL request using the data connection may comprise redundant information, which ensure a reliable transmission of information to the emergency call assistance center 401 and facilitate a synchronization of the received data at the emergency call assistance center 401. The DTMF message may also be acknowledged 410 by the emergency call assistance center 401.

Having transmitted the emergency information in the DTMF messages, the voice connection may be transferred to an emergency call assistant 412 in case the emergency information has been transmitted successfully 411. Using the voice connection, an occupant of the vehicle may interact 413 with an assistant serving his/her emergency call at the emergency call assistance center 401.

Upon successfully receiving the emergency call information at the emergency call assistance center 401, the information may be synchronized or supplemented by each other and output—visually or audibly—to the assistant serving the emergency call. Based on the received emergency information, the assistant may dispatch the appropriate services 414 e.g. request emergency assistance at an emergency call dispatch center 402, contact relatives of the injured person(s), may query further information required from the operator of the vehicle via the established voice connection, etc.

This emergency call procedure as described in the examples above has the advantage that an emergency call may be placed and served by an emergency call assistance center 401 also in situations in which the occupant of the vehicle is seriously injured and/or it is not possible for him/her to request emergency assistance at either an emergency call assistance center 401 or an emergency call dispatch center 402. The emergency information transmitted using the data connection and the voice connection may therefore facilitate the transmission of emergency calls increasing their reliability and ensuring their immediate processing without necessarily requiring the interaction of an occupant of the vehicle.

Figure 5:
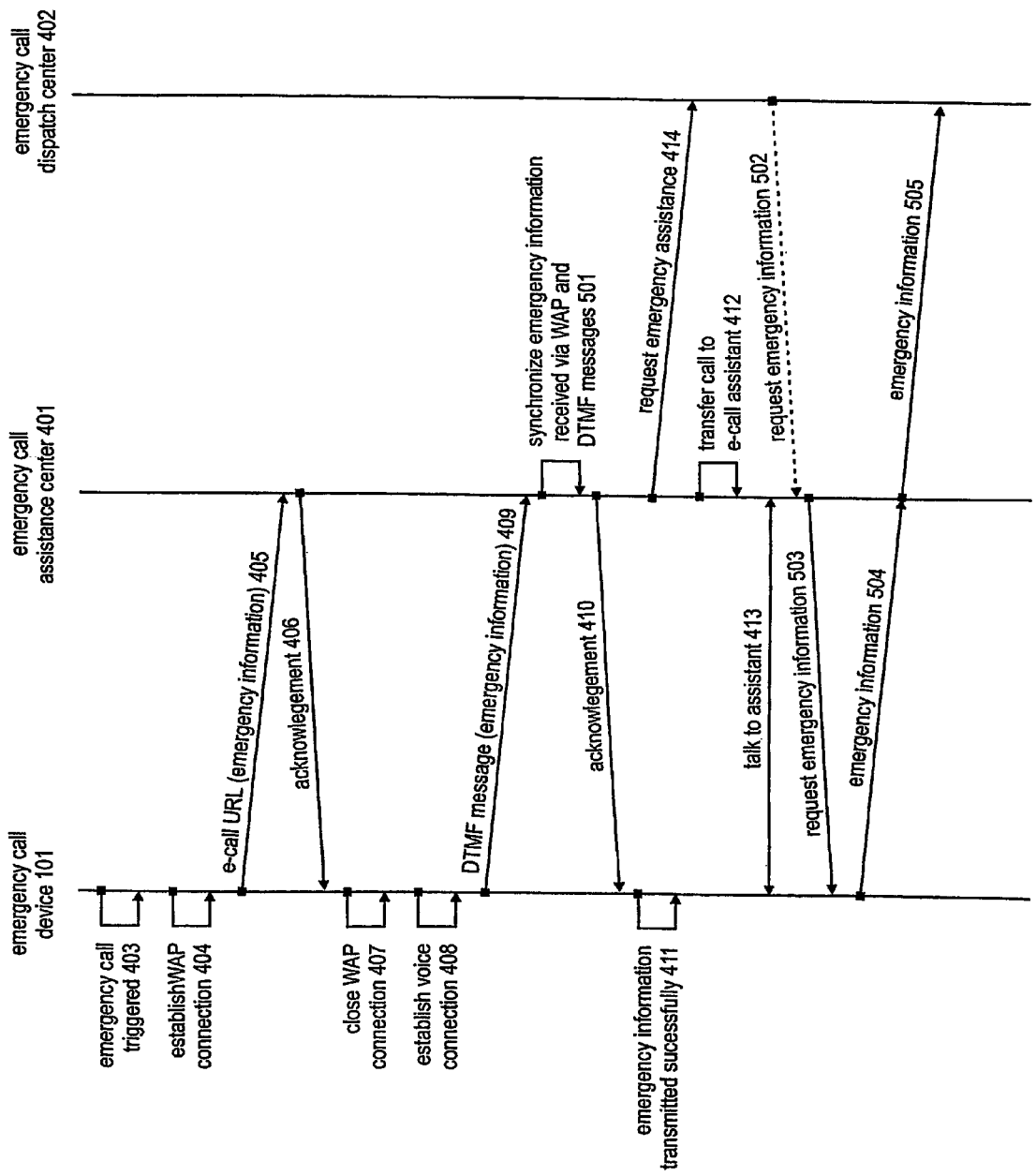
FIG. 5 shows an alternative message flow and tasks performed in an exemplary emergency call system comprising an emergency call device, an emergency call assistance center and an emergency call dispatch center.

FIG. 5 shows an alternative message flow and tasks performed in an exemplary emergency call system comprising an emergency call device 101, an emergency call assistance center 401 and an emergency call dispatch center 402. The emergency call procedure shown in FIG. 5 corresponds to the method shown in FIG. 4 in great parts. Therefore, the corresponding steps in the emergency call procedure will only be briefly discussed.

After an emergency call has been triggered in the vehicle 403, a data connection, such as a WAP connection may be established 404 and the emergency information may be transmitted 405 to the emergency call assistance center 401 by appending them to the request of an emergency call URL. The emergency information transmitted using the data connection may be acknowledged 406 by the emergency call assistance center 401.

After closing the data connection 407, a voice connection to the emergency call assistance center 401 may be established 408. A new set of emergency information is formed at the vehicle and is transmitted 409 using DTMF messages. The emergency call assistance center 401 may process the emergency information received via the data connection and via the voice connection and synchronize the data 501.

After successful processing of the emergency information at the emergency call assistance center 401, those are output to an emergency call serving assistant and the safe reception of emergency information may be acknowledged 410.

At this point of time, the assistant serving the emergency call at the emergency call assistance center 401 may already have dispatched the appropriate services 414 based on the emergency information received e.g. may already have contacted one or several emergency call dispatch centers, such as police, fire or medical assistance.

The voice connection to the emergency call assistance center 401 may be transferred to an emergency call assistant 412 in case it has been determined that the emergency information was transmitted successfully 411 to the emergency call assistance center 401. Another voice connection may be established 414 in order to allow an occupant of the vehicle or the injured person(s) to interact 413 with the emergency call assistance center 401.

In this scenario, it would be also possible that the contacted emergency call dispatch center 402 may request additional emergency information required in order to better serve the emergency call. Therefore, a request message may be transmitted 502 to the emergency call assistance center 401, which may forward this request 503 for emergency information to the emergency call device 101 in the vehicle.

The requested information may be gathered at the vehicle and transmitted via a data or voice connection 504 to the emergency call assistance center 401 and further 505 to the emergency call dispatch center 402. Alternatively, the requested emergency information may also be transmitted directly to the emergency call dispatch center 402. In the latter case, the emergency call assistance center 401 may include an identification (number) or—in case a WAP connection is used for data transmission—a response URL such that the device at the vehicle may transmit the requested emergency information the emergency call dispatch center 402 directly. The response URL in the message sent to the vehicle may be used to redirect the response to the assistance center's request for emergency information to another entity, e.g. to redirect the response from the vehicle to a serving emergency call dispatch center 402 directly.

In an another exemplary scenario, the assistant at the emergency call assistance center 401 may require additional information related to the emergency for further processing the emergency call received from the vehicle and for dispatching the appropriate services. In this case, the emergency call assistance center 401 may request an automatic delivery of these required information from the device serving the emergency call at the vehicle using, for example, a data connection, such as a WAP connection. A request for emergency information may be transmitted from the emergency call assistance center 401 to the device 503 which may gather the relevant information and automatically transmit those requested emergency information 504 back to the emergency call assistance center 401.

As outlined before, these emergency information may then be used by the emergency call assistance center 401 to further request emergency assistance at an emergency call dispatch center 402 or to update latter with the requested auxiliary information. The automatic querying of additional or auxiliary emergency information may be of interest in case the occupant of the vehicle transmitting the emergency call has been seriously injured or is incapable of interacting with the assistant directly, for example, due to his/her inability to speak the national language of the country he/she is currently located in.

The invention claimed is:

1. A method for transmitting an emergency call including emergency information from a vehicle using a mobile communication system, comprising:
   triggering an emergency call at the vehicle,
   establishing a data connection to an emergency call assistance center via the mobile communication system in which the data connection comprises a Wireless Application Protocol (WAP) connection,
   transmitting a first portion of the emergency information to the emergency call assistance center using the WAP data connection as a request for a uniform resource locator (URL) that includes the first portion of the emergency information within the URL request,
   establishing a first voice connection to the emergency call assistance center via the mobile communication system, and
   transmitting a dual tone multi-frequency (DTMF) message including a second portion of the emergency information using the established first voice connection
   wherein the first portion of the emergency information and the second portion of emergency information include redundant emergency information; and
   synchronizing the first portion of the emergency information and the second portion of the emergency information at the emergency assistance center such that errors during transmission may be corrected.

2. The method according to claim 1 further comprising detecting the end of the (DTMF) message transmitted via the first voice connection at the emergency call assistance center.

3. The method according to claim 1 further comprising determining whether the emergency information has been successfully transmitted to the emergency call assistance center, and transferring the first voice connection to an emergency assistant at the emergency call assistance center if the emergency information has been transmitted successfully, and establishing a second voice connection to a emergency call dispatch center via the mobile communication system if the emergency information has not been transmitted successfully.

4. The method according to claim 1 further comprising starting an emergency call countdown during which an occupant of the vehicle may cancel the triggered emergency call.

5. The method according to claim 1 further comprising testing the availability of the mobile communication system.

6. The method according to claim 5 where in testing the availability of the mobile communication system, a mobile terminal in the vehicle for transmitting the emergency information and the communication network of the communication system are tested for availability.

7. The method according to claim 1 where the emergency information transmitted using the data connection comprises a geographical position of the vehicle and an identification number of the vehicle.

8. The method according to claim 7 where the emergency information further comprises a timestamp of a generation of the emergency message, a vehicle descriptor, a breakdown status and additional information and parameters defined by an occupant of the vehicle.

9. The method according to claim 8 where the emergency information further comprises a history of information related to a time period before an emergency, where the history of information indicates at least one or a combination of the following parameters: the steering of the vehicle, a level of deceleration of the vehicle and a driving direction of the vehicle.

10. The method according to claim 1 where the emergency information transmitted using the voice connection comprises a geographical position of the vehicle and an identification number of the terminal transmitting the emergency information.

11. The method according to claim 1 further comprising synchronizing the emergency information received via the data connection and the first voice connection at the emergency call assistance center, and transmitting a confirmation for the emergency information received from the emergency call assistance center to the vehicle.

12. The method according to claim 1 further comprising the emergency call assistance center requesting emergency information from the vehicle via the mobile communication system.

13. The method according to claim 1 further comprising the emergency call assistance center informing at least one emergency call dispatch center on the emergency using the received emergency information.

14. An emergency call device for transmitting an emergency call including emergency information from a vehicle using an mobile communication system, comprising:
   a triggering means for triggering an emergency call at the vehicle, a communication terminal having:
   means for establishing a data connection to an emergency call assistance center via the mobile communication system wherein the data connection comprises a Wireless Application Protocol (WAP) connection,
   means for establishing a first voice connection to the emergency call assistance center via the mobile communication system,
   means for transmitting a first portion of the emergency information to the emergency call assistance center using the WAP data connection as a request for a uniform resource locator (URL) that includes the first portion of the emergency information within the URL request, and means for transmitting a dual tone multi-frequency (DTMF) message including a second portion of the emergency information using the established first voice connection, wherein the first portion of the emergency information and the second portion of emergency information include redundant emergency information such that the first portion of the emergency information and the second portion of the emergency information may be synchronized at the emergency assistance center to correct errors during transmission.

15. The emergency call device according to claim 1 further comprising means for determining the end of the DTMF message transmitted using the first voice connection.

16. The emergency call device according to claim 15 further comprising:

means for transferring the first voice connection to an emergency assistant at the emergency call assistance center if the emergency information has been transmitted successfully, and where the communication terminal is adapted to establish a second voice connection to a emergency call dispatch center via the mobile communication system if the emergency information has not been transmitted successfully.

17. The emergency call device according to claim 14 further comprising a position determination means for determining a geographical position of the vehicle.

18. The emergency call device according to claim 14 further comprising processing means for formatting emergency information.

19. The emergency call device according to claim 14 further comprising a timer for controlling an emergency call countdown during which an occupant of the vehicle may cancel the triggered emergency call.

20. The emergency call device according to claim 14 where the processing means is adapted to form emergency information comprising a geographical position of the vehicle and an identification number of the vehicle.

21. The emergency call device according to claim 18 where the processing means are further adapted to synchronize the emergency information received via the data connection and the first voice connection.

22. The emergency call device according to claim 14 where the triggering means is an emergency button or a sensor adapted to trigger an emergency call.

23. The emergency call system for executing the method according to claim 14 comprising at least one emergency call, device and an emergency call assistance center.

* * * * *